G. BASSETT.
Concrete Pavements.
No. 146,423.  Patented Jan. 13, 1874.
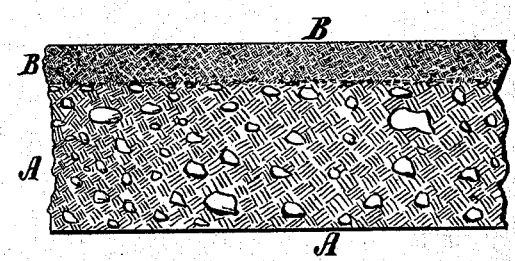
Witnesses:
Inventor:

UNITED STATES PATENT OFFICE.

GEORGE BASSETT, OF SYRACUSE, NEW YORK, ASSIGNOR TO HIMSELF AND THOMAS G. BASSETT, OF SAME PLACE.

IMPROVEMENT IN CONCRETE PAVEMENTS.

Specification forming part of Letters Patent No. 146,423, dated January 13, 1874; application filed August 16, 1873.

*To all whom it may concern:*

Be it known that I, GEORGE BASSETT, of Syracuse, in the county of Onondaga and State of New York, have invented a new and Improved Concrete Pavement, of which the following is a specification:

In making concrete pavements, sidewalks, &c., it has, up to this time, been considered necessary to use foreign, Portland, and other expensive manufactured cement, because it dries and hardens soon after being laid down, so that the public need not long be excluded from the places paved or covered.

Our native Rosendale and other cements are, as is well known, capable of making as hard and durable artificial stone, by the mixture of sand, gravel, &c., as the aforesaid expensive cements; but, owing to the long time (from three to six months) required for them to set and harden, it has been found impracticable to utilize them for pavements, roadways, &c., such as are made by laying cement while in a plastic state, and allowing it time to set and harden before use; but, owing to the great difference in the cost of the native and foreign cements, it is highly desirable to utilize the former in some way, inasmuch as they are equally as durable when sufficiently hardened.

Now, I propose to get over the difficulty by using the native cements for about three-fourths (more or less) of the pavement, placing the same at the bottom, and about one-fourth of foreign cement upon the top, which answers the purpose just as well for rendering the pavement capable of use as soon as the all-Portland-cement pavement is, for the upper crust of the latter cement dries as soon as when the pavement is wholly of such cement, and becomes sufficiently hard for surface wear, and the lower mass of native cement, being sustained by the surface of the road-bed, supports the crust, so that it does not break while the slower drying process of the lower portion goes on.

It has been proposed to utilize these cheap cements for sidewalks by drying and quickly setting them by the application of gases, which will supply the necessary carbon to harden them quickly; but the difficulty of confining the gases upon the cement when spread on the ground is so great as to render the process impracticable, so that such means are not now used, except when the blocks are made in molds and hardened in a kiln before being laid down; but this is an objectionable mode of making pavements, because of the additional labor involved and the difficulty of making the pavement in separate blocks, so that the surface will be exactly even; and, besides, both processes of drying by gases involve expense, which I save altogether.

I propose to use the common cheap cements for the foundation, as before described, whether I make the pavement continuous or separate it into sections.

In carrying out my invention, I first lay a bed of concrete, of any desirable thickness, of Rosendale or any other best American cement, and immediately, while it is in a plastic state, enamel the surface with a top dressing of Portland or other best English manufactured cement, so that the two shall be united in one mass or solid block.

Generally I will separate the pavement into flags of any desired size by the method described in my patent of October 29, 1872; but it may be separated by any other process; and I also propose to construct such flags of common cement topped with Portland cement, to be afterward laid.

The drawing is a section of a small piece of pavement such as I propose to make.

A is the lower mass of common cement, and B is the top crust of Portland cement.

Having thus described my invention, I claim as new and desire to secure by Letters Patent—

A foot-pavement consisting of a foundation of slowly-setting cement and a top surface of quick-setting cement, as and for the purpose described.

GEO. BASSETT.

Witnesses:
WM. H. GUNN,
THOS. G. BASSETT.